United States Patent [19]

Chou et al.

[11] Patent Number: 5,716,066
[45] Date of Patent: Feb. 10, 1998

[54] TOW ASSEMBLY

[75] Inventors: Shu-Ying Chou, Troy; Alethea Keesia Morris, Royal Oak; Giles David Bryer, Dearborn, all of Mich.

[73] Assignee: Saturn Corporation, Troy, Mich.

[21] Appl. No.: 661,108

[22] Filed: Jun. 10, 1996

[51] Int. Cl.⁶ .................................................. B60D 1/173
[52] U.S. Cl. ............................... 280/501; 280/460.1
[58] Field of Search ........................ 280/495, 500, 280/501, 502, 504, 505, 515, 452, 453, 460.1, 480

[56] References Cited

U.S. PATENT DOCUMENTS

| | | |
|---|---|---|
| 2,151,837 | 3/1939 | Burke. |
| 2,946,305 | 7/1960 | Hill. |
| 3,531,834 | 10/1970 | Weman. |
| 3,739,432 | 6/1973 | Sander et al.. |
| 3,741,588 | 6/1973 | Dotterweich ............... 280/495 |
| 3,792,892 | 2/1974 | Shields. |
| 3,845,527 | 11/1974 | Lombardi. |
| 4,607,858 | 8/1986 | Wagner. |
| 4,664,403 | 5/1987 | Livingstone ............ 280/460.1 |
| 4,991,271 | 2/1991 | Bauer et al.. |
| 5,193,837 | 3/1993 | Fink et al. ................ 280/495 |
| 5,372,346 | 12/1994 | Upchurch et al.. |

OTHER PUBLICATIONS

Drawing—1995 S/T Truck—front tow assembly.
Drawing—1995 M/L Truck—front tow assembly.
Drawing—Current Tow Bracket Assembly—typical aftermarket front tow assembly.
Drawing—1995 C/K Truck—front tow assembly.
Drawing—1995 P Truck—front tow assembly.

Primary Examiner—Jesus D. Sotelo
Attorney, Agent, or Firm—Kathryn A. Marra

[57] ABSTRACT

A tow assembly is provided for use in a vehicle having a generally laterally extending front bumper rail and generally longitudinally extending, opposing first and second side rails. The tow assembly includes first and second bumper mounting brackets each securely attached to the front bumper rail and first and second side mounting brackets each securely attached to the first and second side rails, respectively. The tow assembly further includes first and second detachable coupling members engaging and extending between the bumper and mounting brackets on respective sides of the vehicle. Advantageously, the tow assembly has a coupled condition in which the coupling members couple together the respective bumper and side mounting brackets for flat towing of the vehicle and the tow assembly has a decoupled condition in which the coupling members are removable from the tow assembly such that each of the bumper brackets and side mounting brackets are separate and independent from each other when the vehicle is being driven for minimal effects on vehicle vibration and noise.

15 Claims, 4 Drawing Sheets

TOW ASSEMBLY

This invention relates to a tow assembly used for flat towing of a vehicle.

BACKGROUND OF THE INVENTION

It is known to provide a tow assembly for flat towing of a passenger vehicle from the front which includes large heavy brackets mounted on opposing sides of the vehicle body and a laterally extending draw bar permanently welded to and connecting the brackets to form a single relatively heavy tow assembly, typically weighing about 35–50 pounds. This tow assembly also remains attached to the vehicle when it is being driven under its own power. Since the typical tow assembly is relatively heavy and is integrated as a single large device mounted to the vehicle body, this tow assembly typically remains in place during the lifetime of the vehicle. The prior art believed that this heavy tow assembly was needed for strength and durability during towing, especially on passenger cars having a unibody type construction without a frame.

Prior art tow assemblies designed for passenger cars typically have the shortcoming of leaving a relatively heavy weight on the front end of the vehicle at all times during the operation of the vehicle. This can alter the dynamics of the vehicle during driving such that increased noise and vibration may be experienced by the vehicle. In addition, effectiveness of HVAC functions may be reduced if air intake paths are partially obstructed by the tow assembly.

The prior art also shows that for front towing of trucks having a frame-type construction, the tow hooks can be permanently bolted directly to each side of the truck frame with the use of a single bracket.

SUMMARY OF THE INVENTION

This invention provides an improved tow assembly, especially useful for flat towing of passenger vehicles. Advantageously, the tow assembly is lightweight and has portions which are easily detachable when the vehicle is not being towed, while maintaining strength and durability during towing. Advantageously, the tow assembly is lighter than tow assemblies of the prior art and distributes the remaining weight at separate and independent locations on the vehicle such that vehicle dynamics and noise and vibration paths are negligibly altered by the minimal portions of the tow assembly remaining on the vehicle during driving conditions. Also advantageously, the tow assembly does not alter the original appearance of the vehicle when normally driven under its own power since the detachable portions of the tow assembly are removed and the remaining components of the tow assembly are hidden from view.

These advantages are accomplished in a preferred form of the invention by providing a tow assembly for use in a vehicle having a generally laterally extending front bumper rail and generally longitudinally extending, opposing first and second side rails. The tow assembly includes first and second bumper mounting brackets each securely attached to the front bumper rail and first and second side mounting brackets each securely attached to the first and second side rails, respectively. The tow assembly further includes first and second detachable coupling members each being longitudinally elongated. The first detachable coupling member extends longitudinally between and engages the first bumper and side mounting brackets and the second detachable coupling member longitudinally extends between and engages the second bumper and side mounting brackets. Advantageously, the tow assembly has a coupled condition in which the coupling members extend between and couple together the respective bumper and side mounting brackets for flat towing of the vehicle and the tow assembly has a decoupled condition in which the coupling members are removable from the tow assembly such that each of the bumper brackets and side mounting brackets are separate and independent from each other when the vehicle is being driven for minimal effects on vehicle vibration and noise.

Preferably, the first and second coupling members have a combined weight which is approximately equal to half a total weight of the tow assembly. Also preferably, each of the side mounting brackets has a C-shaped portion for engaging the respective side rails. The first and second bumper mounting brackets and the first and second side mounting brackets each include features for engaging and receiving the coupling members with the features being coaxially aligned on respective sides of the vehicle for easy insertion and removal of the coupling members.

The tow assembly may also include side reinforcement members secured to each of the side rails and aligned with each of the side mounting brackets and bumper reinforcement members secured to the bumper rail and aligned with each of the bumper mounting brackets.

BRIEF DESCRIPTION OF THE DRAWINGS

These and other features, objects and advantages of the present invention will become apparent upon consideration of the following description of the preferred embodiment, appended claims and accompanying drawings in which:

DESCRIPTION OF THE PREFERRED EMBODIMENT

Figure 1:
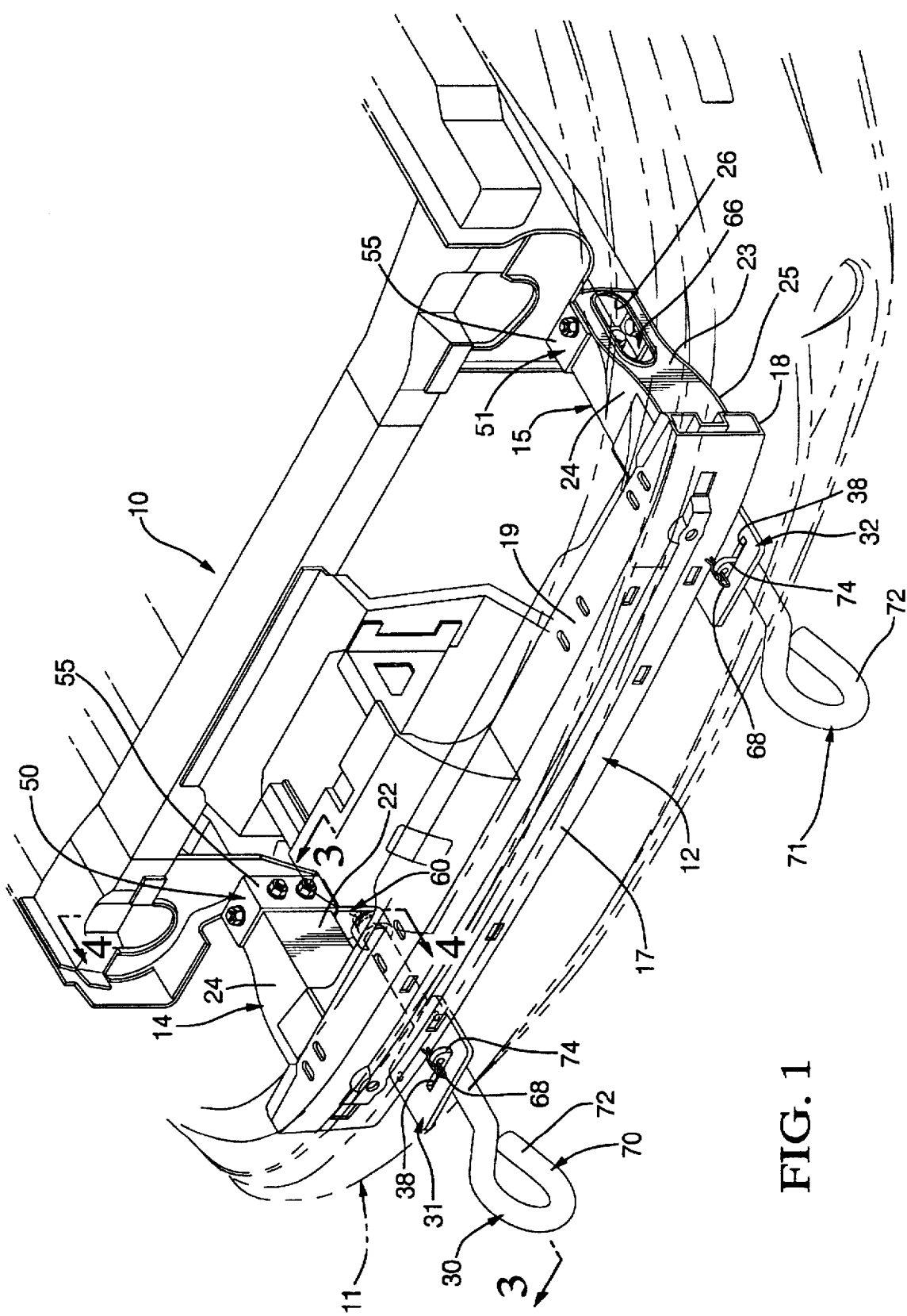
FIG. 1 is a perspective view of a front of a passenger vehicle partially-broken-away and having a tow assembly mounted thereto in a fully assembled condition for towing and with the bumper fascia shown in phantom.
Figure 3:
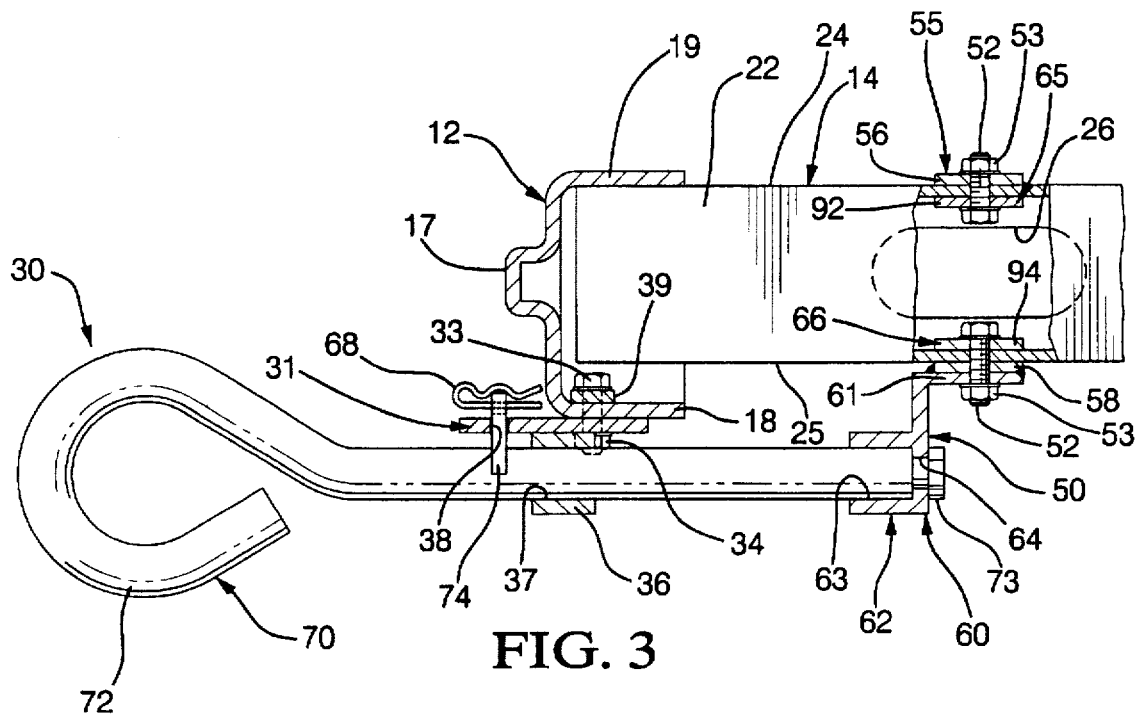
FIG. 3 is a section as viewed along line 3—3 of FIG. 1.

Referring to FIG. 1, it is seen that a passenger vehicle 10 has an underlying unibody-type construction including a generally laterally extending front bumper rail 12 and generally longitudinally extending first and second side rails 14, 15 located on the right and left sides of the vehicle 10, respectively. The bumper rail 12 and side rails 14, 15 are each preferably made of sheet metal suitably stamped and welded together to form the bumper and side rails 12, 14, 15. The bumper rail 12 includes a front bumper wall 17, a lower bumper wall 18, and an upper bumper wall 19. The side rails 14, 15 each include an inner side wall 22, an outer side wall 23, an upper side wall 24, and a lower side wall 25. Preferably, the outer side walls 23 of the side rails 14, 15 each include side access openings 26 as best shown in FIGS. 1 and 3. The bumper rail 12 is suitably secured to the side rails 14, 15, such as by welding. A bumper fascia 11, shown in phantom lines in FIG. 1, provides a decorative cover for the bumper rail 12. A tow assembly 30, as described below, may either extend below the fascia 11 or out through suitable openings in the fascia 11 for front, flat towing of the vehicle 10.

Referring to FIG. 1, a tow assembly 30 generally includes the component parts of first and second bumper mounting brackets 31, 32 secured to the bumper rail 12, first and second side mounting brackets 50, 51 attached to the first and second side rails 14, 15, respectively, first and second detachable coupling members 70, 71 for coupling and decoupling the bumper mounting brackets 31, 32 and side mounting brackets 50, 51 on corresponding sides of the vehicle 10, as described further hereinafter.

Figure 2:
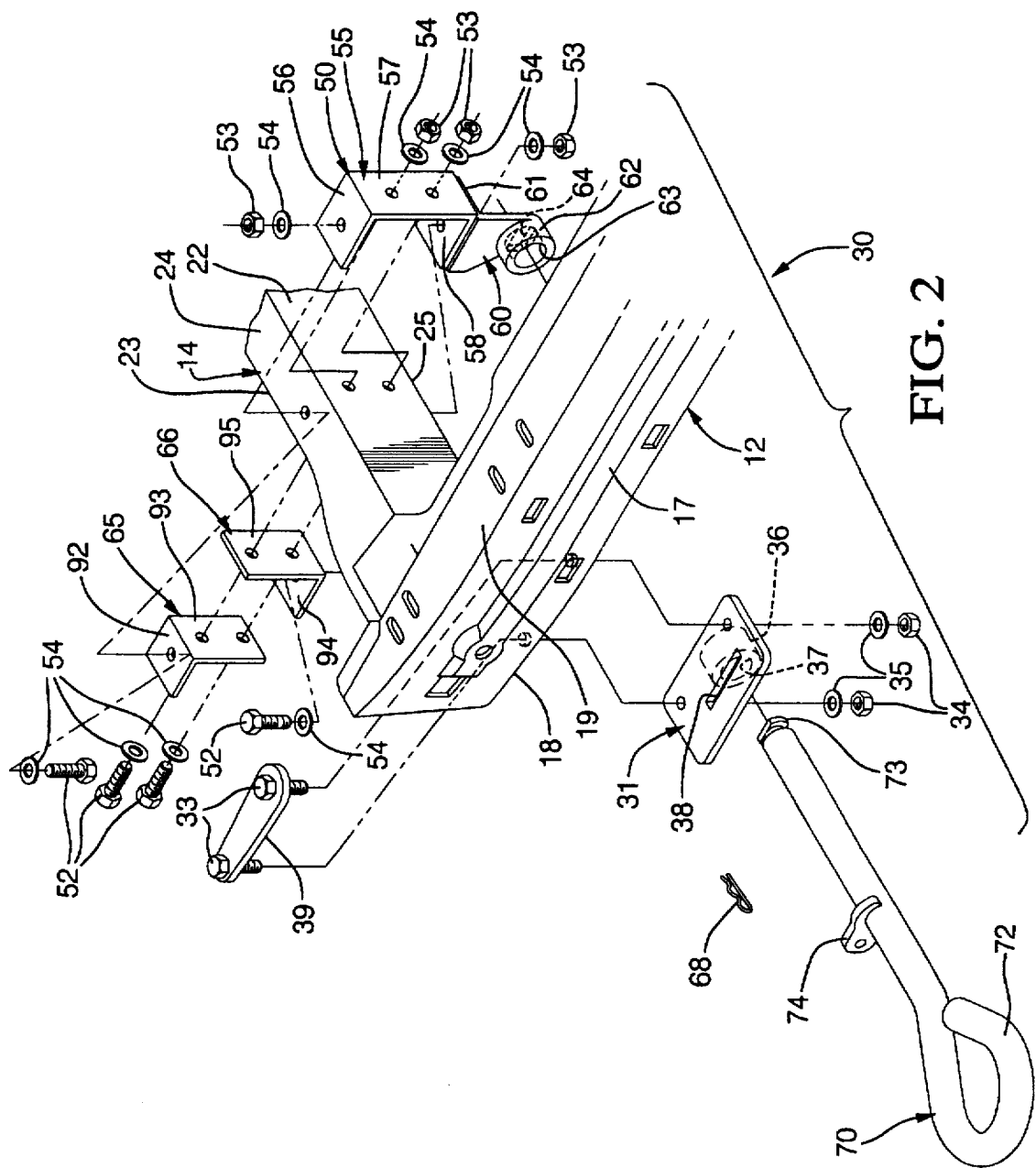
FIG. 2 is an exploded perspective view of the tow assembly on the right side of the vehicle.

Referring to FIGS. 1–4, the bumper mounting brackets 31, 32 are each securely mounted to the lower bumper wall 18 of the bumper rail 12 at opposing left and right sides of the bumper rail 12, such as by bumper bolts 33 and corresponding bumper nuts 34 and optional bumper washers 35. The bumper mounting brackets 31, 32 are preferably each made of a sturdy material, such as steel or other metal. The bumper mounting brackets 31, 32 each include means for engaging and receiving the coupling members 70, 71, such as a sleeve portion 36 welded to each of the bumper mounting brackets 31, 32 with the sleeve portions 36 each having a bumper mounting aperture 37 therein for receiving the respective coupling members 70, 71 therethrough. Preferably, the bumper mounting brackets 31, 32 each have a generally planar shape and abut a bottom surface of the lower bumper wall 18 for attachment thereto by the respective bumper bolts 33, as best shown in FIGS. 2 and 3. Also preferably, the bumper mounting brackets 31, 32 each include a laterally extending slot 38 therein for attachment and positioning of the coupling members 70, 71, as described further hereinafter. It will be appreciated that the first and second bumper mounting brackets 31, 32 are separate and independent from each other and are laterally spaced apart on the bumper rail 12.

Bumper reinforcement members 39 are each preferably mounted on upper surfaces of the lower bumper wall 18 and aligned above the respective bumper mounting brackets 31, 32 and attached to the bumper rail 12 and the bumper mounting brackets 31, 32 by the bumper bolts 33. The bumper reinforcement members 39 are each preferably made of a sturdy metallic material and are laterally elongated and generally planar in shape for easy insertion into the bumper rail 12 during assembly. It will be appreciated that the bumper reinforcement members 39 could be eliminated, especially if the bumper mounting brackets 31, 32 are alternately designed with a closed section instead of being planar.

Figure 4:
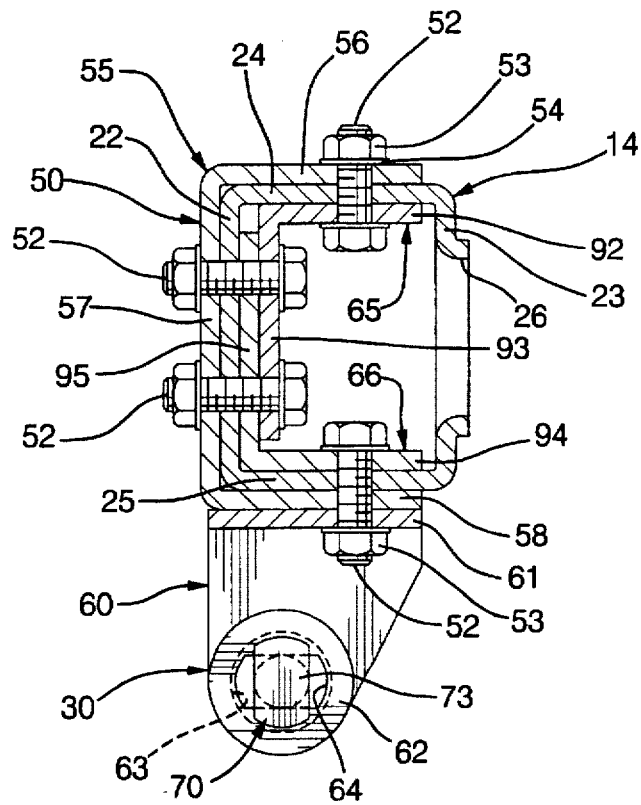
FIG. 4 is a section as viewed along line 4—4 of FIG. 1.

Referring to FIGS. 1–4, the side mounting brackets 50, 51 are each securely mounted to the opposing side rails 14, 15, such as by a plurality of side rail bolts 52 and corresponding side rail nuts 53 and optional side rail washers 54. The side mounting brackets 50, 51 are each preferably made of a sturdy material, such as steel or other metal. The side mounting brackets 50, 51 each preferably include an upper C-shaped bracket portion 55 with an upper bracket wall 56 attached to the upper side wall 24, an inner bracket wall 57 attached to the inner side wall 22, and a lower bracket wall 58 attached to the lower side wall 25, as best shown in FIG. 4. The side mounting brackets 50, 51 each preferably include lower bracket portions 60 each having an upper wall 61 secured to the lower bracket walls 58 of the C-shaped bracket portions 55, such as by pre-welding. The side mounting brackets 50, 51 each preferably also include means for engaging and receiving the coupling members 70, 71, such casing portions 62 integrally formed with the lower bracket portions 60 and each having a side mounting aperture 63 therein for receiving the respective coupling members 70, 71 therethrough. Also preferably, the casing portions 62 each include means for fixing and orienting the coupling members 70, 71, such as a rearward elongated keyhole 63, as described further hereinafter.

The tow assembly 30 preferably includes upper and lower side reinforcement members 65, 66 aligned with corresponding side mounting brackets 50, 51. The upper side reinforcement members 65 are preferably L-shaped and include upper reinforcement walls 92 abutting bottom surfaces of the upper side walls 24 and aligned with the upper bracket walls 56 and also having inner reinforcement walls 93 adjacent inner surfaces of the inner side walls 22 and aligned with the inner bracket walls 57 of the C-shaped bracket portions 55 of the side mounting brackets 50, 51. The lower side reinforcement members 66 are preferably L-shaped and include lower reinforcement walls 94 abutting upper surfaces of the lower side walls 25 and aligned with the lower bracket walls 58 and also having inner reinforcement walls 95 positioned between the inner reinforcement walls 93 of the upper side reinforcement members 65 and the inner side walls 22 and aligned with the inner bracket walls 57 of the C-shaped bracket portions 55 of the side mounting brackets 50, 51. Thus, the upper and lower side reinforcement members 65, 66 cooperatively provide a generally C-shaped reinforcement aligned with the C-shaped bracket portion 55 of the side mounting brackets 50, 51 to strengthen the side rails 14, 15 for towing. It will be appreciated that the upper and lower side reinforcement members 65, 66 are two separate pieces for ease of assembly through the side access openings 26, however, the upper and lower side reinforcement members 65, 66 could also be combined into a single C-shaped reinforcement. The upper and lower side reinforcement members 65, 66, and the side mounting brackets 50, 51 each are matably aligned for receiving the plurality of side rail bolts 52 therethrough for attachment to the respective side rails 14, 15.

It will be appreciated that the first and second side mounting brackets 50, 51 and their respective upper and lower side reinforcement members 65, 66 are independent and separate from each other and are laterally spaced apart on opposing side rails 14, 15 of the vehicle 10. In addition, the first and second side mounting brackets 50, 51 are each longitudinally spaced apart rearward of the first and second bumper mounting brackets 31, 32, respectively. Thus, the tow assembly 30 has four separate and independent attachment locations on the vehicle 10, two on opposing sides of the bumper rail 12 and one on each of the opposing side rails 14, 15.

The tow assembly 30 further includes first and second detachable coupling members 70, 71 which preferably are each longitudinally elongated bars. The coupling members 70, 71 are each easily removable from the tow assembly for coupling and decoupling the bumper and side mounting brackets 31, 32, 50, 51 on respective sides of the vehicle, as described further hereinafter. Preferably, each of the coupling members 70, 71 has a forward hook portion 72 thereon for suitable attachment to another vehicle (not shown) for flat towing. The coupling members 70, 71 are preferably made of a sturdy material, such as metal. The coupling members 70, 71 each preferably include a locking feature, such as a rearward key portion 73 for fixed attachment with the keyholes 64 on the lower bracket portions 60 of the side mounting brackets 50, 51. The coupling members 70, 71 each preferably include an apertured projection 74 for alignment and insertion through the slots 38 on the bumper mounting brackets 31, 32 during assembly. The tow assembly 30 may further include spring pins 68 for insertion through the apertured projections 74, as described further hereinafter.

The tow assembly 30 is assembled to the vehicle 10 as follows. The bumper reinforcement members 39 are inserted through the back side of the bumper rail 12 and placed atop the upper surface of the lower bumper wall 18. The bumper mounting brackets 31, 32 are aligned below the bumper reinforcement members 39 with the bumper mounting brackets 31, 32 abutting the lower surface of the lower bumper wall 18. Thus, the lower bumper wall 18 is sandwiched between the bumper mounting brackets 31, 32 and the bumper reinforcement members 39 on the left and right sides of the bumper rail 12. The bumper mounting brackets 31, 32 and bumper reinforcement members 39 are mounted to the bumper rail 12, such as by the plurality of bumper bolts 33 and corresponding bumper washers and nuts 35, 34. However, it will be appreciated that other fastening methods could be used or that the bumper mounting brackets 31, 32 and bumper reinforcement members 39 could be integrally formed with the bumper rail 12.

Also during assembly, the upper and lower side reinforcement members 65, 66 are inserted through the side access openings 26 in the side rails 14, 15 for attachment to the inner surfaces of the inner, upper and lower side walls 22, 24, 25 of the side rails 14, 15. Also, the side mounting brackets 50, 51 are attached to the side rails 14, 15 by sliding the C-shaped bracket portions 55 around the upper, lower and inner side walls 24, 25, 22 with the lower bracket portions 60 and casing portions 62 extending downwardly therefrom. The first side mounting bracket 50 and corresponding side reinforcement members 65, 66 are secured to the first side rail 14, such as by a plurality of side rail bolts 52. The second side mounting bracket 51 and the corresponding side reinforcement members 65, 66 are secured to the second side rail 15, such as by a plurality of side rail bolts 52. It will be appreciated that one of the inner bolts could be eliminated on each side of the inner side walls 22 so that only three bolts are utilized to mount each of the side mounting brackets 50, 51. It will further be appreciated that other fastening methods could also be used or that the side mounting brackets 50, 51 and side reinforcement members 65, 66 could be integrally formed with the side rails 14, 15.

It will be appreciated that the side mounting brackets 50, 51 and the side reinforcement members 65, 66 remain attached to the side rails 14, 15 and that the bumper mounting brackets 31, 32 and the bumper reinforcement members 39 remain attached to the bumper rail 12 when the vehicle 10 is being driven under its own power. However, the coupling members 70, 71 are removed from the vehicle 10 when the vehicle 10 is being driven under its own power and is not being towed. Advantageously, the coupling members 70, 71 and the forwardly protruding hook portions 72 are removed from the vehicle 10 during normal driving conditions such that the vehicle 10 looks pleasing and the remaining components of the tow assembly 30 such as the bumper and side mounting brackets 31, 32, 50, 51 are hidden from view. It will further be appreciated that in this decoupled condition with the coupling members 70, 71 removed from the tow assembly 30, the weight of the components remaining attached to the tow assembly 30 are distributed over four locations on the vehicle; two of the locations being at the bumper mounting brackets 31, 32 on the bumper rail 12, and the other two locations being at the side mounting brackets 50, 51 on the side rails 14, 15. It will be appreciated that the components remaining on the vehicle 10 while driving under its own power includes everything except the detachable coupling members 70, 71 and the associated spring pins 68. Advantageously, removal of the coupling members 70, 71 removes about half of the weight of the tow assembly 30 from the vehicle when being driven. Also advantageously, removal of the coupling members 70, 71 uncouples the first and second bumper mounting brackets 31, 32 from the first and second side mounting brackets 50, 51.

Advantageously, the total weight of the components remaining on the vehicle 10 including the bumper mounting brackets 31, 32, the side rail mounting brackets 50, 51, the upper and lower side reinforcement members 65, 66, the bumper reinforcement members 39 and their associated fasteners 33, 34, 35, 52, 53, 54 all have a maximum combined weight of only about 7–15 lb. or about the half the total weight of the tow assembly 30. Thus, this relatively small amount of total weight distributed over four separate and independent vehicle locations has a minimal effect on the overall vehicle dynamics and a minimal effect on vehicle noise and vibration paths. In addition, these relatively small and lightweight components which are strategically located on the bumper rail 12 and the side rails 14, 15 can easily be positioned so as not to block any air intake portals (not shown) for the vehicle HVAC system. Also advantageously, the tow assembly 30 without the coupling members 70, 71 does not couple the bumper rail 12 to the side rails 14, 15 when the vehicle 10 is being driven under its own power. This advantageously minimizes changes in the dynamic characteristics of the vehicle 10 while driving.

In the coupled condition shown in FIGS. 1, 3 and 4, the side mounting apertures 63 of the first and second side mounting brackets 50, 51 are coaxially aligned with the bumper mounting apertures 37 of the first and second bumper mounting brackets 31, 32, respectively. This allows for easy attachment and removal of the coupling members 70, 71, as will now be described.

The tow assembly 30 is completely assembled to the coupled condition for flat towing of the vehicle 10 as follows. The coupling members 70, 71 are easily inserted through the respective coaxially aligned bumper mounting apertures 37 and side mounting apertures 63 such that the coupling members 70, 71 extend between and engage the bumper mounting brackets 31, 32 and the side mounting brackets 50, 51 on the respective sides of the vehicle 10. The coupling members 70, 71 are then releasably attached to the respective bumper and side rail mounting brackets 31, 32, 50, 51 in a suitable manner with the hook portions 72 of the coupling members 70, 71 extending forward of the bumper rail 12 for front access. For example in the embodiment shown, the coupling members 70, 71 are inserted through the respective bumper and side rail mounting brackets 31, 32, 50, 51 until the locking features, such as key portions 73 on the coupling members 70, 71 are inserted through the corresponding means for fixing and orienting, such as keyholes 64 on the side mounting brackets 50, 51. Also, the apertured projections 74 are aligned beneath the slots 38 on the bumper mounting brackets 31, 32. Then the coupling members 70, 71 may each be twisted approximately 90 degrees such that the key portions 73 are locked in the keyholes 64 whereby the coupling members 70, 71 cannot be longitudinally pulled out of the bumper and side mounting brackets 31, 32, 50, 51. In addition the apertured projections 74 are received through the slots 38 in the bumper mounting brackets 31, 32 and the spring pins 68 are inserted through each of the apertured projections 74 to further secure the coupling members 70, 71 to the bumper and side mounting brackets 31, 32, 50, 51. Thus, the tow assembly 30 is now in the coupled condition as shown in FIG. 1 and is ready to be suitably attached to a forward located tow vehicle for flat towing. It will be appreciated that the side mounting brackets 50, 51 largely support the forward loads during towing and that the bumper mounting brackets 31, 32 cooperatively support lateral loads when the vehicle 10 is being turned during towing.

The total weight of the tow assembly 30 including the coupling members 70, 71 is preferably a relatively light weight of about 15–28 lbs. It will be appreciated that the first coupling member 70 extends between and couples together the first bumper and side mounting brackets 31, 50 and that the second coupling member 71 extends between and couples together the second bumper and side mounting brackets 32, 51. The tow assembly 30 in the fully assembled, coupled condition as shown is FIG. 1, has good durability for towing and also prevents deformation of the vehicle 10 during towing due to the coupling effect of the coupling members 70, 71.

When the vehicle 10 is no longer being flat towed, the coupling members 70, 71 are advantageously easily detached from the vehicle 10 such that the tow assembly returns to the decoupled condition without the coupling members 70, 71. The coupling members 70, 71 are easily removable due to their longitudinally elongated shape and coaxial alignment of the means for engaging and receiving the coupling members 70, 71 on the bumper and side mounting brackets 31, 32, 50, 51. Advantageously, the coupling members 70, 71 are removed such that a substantial amount of the weight, preferably about half, of the tow assembly 30 is removed when the vehicle 10 is being driven under its own power for minimal effect on the vehicle dynamics and noise and vibration paths. Also advantageously, removal of the coupling members 70, 71 decouples the bumper rail 12 from the side rails 14, 15 which also minimizes any changes in vehicle dynamics and noise and vibration paths that the relatively small weight left on the vehicle 10 might produce. Also advantageously, removal of the coupling members 70, 71 returns the vehicle 10 to its original aesthetics since the remaining components of the tow assembly 30 are hidden from view.

It will be understood that a person skilled in the art may make modifications to the preferred embodiment shown herein within the scope and intent of the claims. For example, although the tow assembly 30 is shown with bumper reinforcement members 39 and upper and lower side reinforcements 65, 66, it will be appreciated that these may be eliminated with the bumper and side mounting brackets 31, 32, 50, 51 providing sufficient strength for the tow assembly 30. It will further be appreciated that the bumper and side mounting brackets 31, 32, 50, 51 may be fastened to the vehicle 10 in any suitable manner which securely and relatively permanently attaches the mounting brackets 31, 32, 50, 51 to the vehicle 10. It will be appreciated that the mounting brackets 31, 32, 50, 51 may have a variety of suitable shapes with planar sections, closed sections, or a combination thereof, as long as they are mounted at four separate and independent locations with two bumper mounting brackets 31, 32 being laterally spaced apart on the bumper rail 12 and side mounting brackets 50, 51 each on the side rails 14, 15. The bumper and side mounting brackets 31, 32, 50, 52 also preferably have means for engaging and receiving the coupling members 70, 71 therethrough which are preferably coaxially aligned on the respective sides of the vehicle 10, such as bumper mounting apertures 37 and side mounting apertures 63. It will be appreciated that many other coaxially aligned features located on the bumper and side mounting brackets 31, 32, 50, 51 for engaging and receiving the coupling members 70, 71 are possible. It will also be appreciated that the bumper and side mounting brackets preferably include means for fixing and orienting the coupling members 70, 71 such as keyholes 64, but many other variations are possible. It will further be appreciated that the coupling members 70, 71 may be any longitudinally elongated shape which is relatively easily detachable from the bumper and side mounting brackets 31, 32, 50, 51. Although the key portions 73 and keyholes 64 are shown, there are many other possible ways to position and orient the coupling member 70, 71 relative the mounting brackets 31, 32,50, 51.

Figure 5:
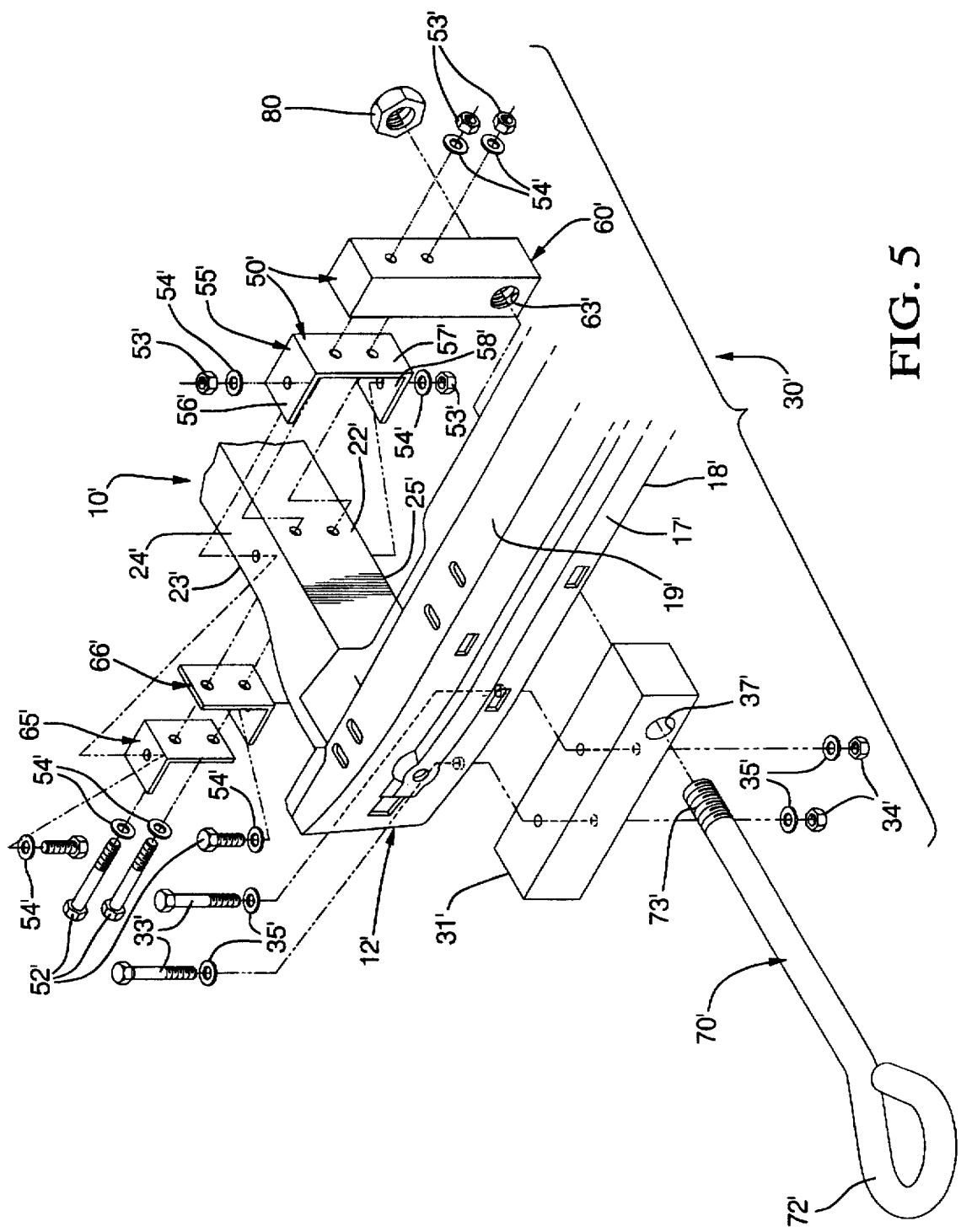
FIG. 5 is an exploded perspective view of an alternate embodiment of the tow assembly on the left side of the vehicle.

As another example, an alternate embodiment of the tow assembly 30' is shown in FIG. 5. Similar features will be denoted by similar numbers having a prime ('). A passenger vehicle 10' includes a generally laterally extending front bumper rail 12' and generally longitudinally extending side rails 14', 15'. The bumper rail 12' includes a front bumper wall 17', a lower bumper wall 18', and an upper bumper wall 19'. The side rails 14' each include an inner side wall 22', an outer side wall 23', an upper side wall 24', and a lower side wall 25'. Preferably, the outer side walls 23' of the side rails 14' each include side access openings (not shown). The bumper rail 12' is suitably secured to the side rails 14', such as by welding.

Referring to FIG. 5, a tow assembly 30' generally includes the component parts of bumper mounting brackets 31' attached to the bumper rail 12', side mounting brackets 50' attached to the side rails 14', and detachable coupling members 70' for coupling and decoupling the respective pairs of bumper and side mounting brackets 31', 50', as described hereinafter. It will be appreciated that only a left side of the vehicle 10' is shown in FIG. 5, but a duplicate, mirrored set of components is also located on the right side of the vehicle 10'.

The bumper mounting brackets 31' are each securely mounted to the lower bumper wall 18' of the bumper rail 12' at opposite right and left sides of the bumper rail 12', such as by bumper bolts 33' and corresponding bumper nuts 34' and optional bumper washers 35'. The bumper mounting brackets 31' preferably include means for engaging and receiving the coupling members 70' therethrough, such as the bumper mounting brackets 31' forming sleeve portions having bumper mounting apertures 37' therein for engaging and receiving the respective coupling members 70' therethrough. The bumper mounting brackets 31' each have a closed section with a generally box-like shape for strength and stability, thus eliminating the need for bumper reinforcement members. Upper surfaces of the bumper mounting brackets 31' abut a bottom surface of the lower bumper wall 18' for attachment thereto by the bumper bolts 33'. It will be appreciated that the bumper mounting brackets 31' are separate and independent from each other and are laterally spaced apart on left and right sides of the bumper rail 12'.

The side mounting brackets 50' are each securely mounted to the opposing side rails 14', such as by a plurality of side rail bolts 52' and corresponding side rail nuts 53' and optional side rail washers 54'. The bumper and side mounting brackets 31', 50' are preferably made of a sturdy material, such as steel or other metal. The side mounting brackets 50' each preferably include a C-shaped bracket portion 55' having an upper bracket wall 56' for attachment to the upper side wall 24', an inner bracket wall 57' for attachment to the inner side wall 22', and a lower bracket wall 58' for attachment to the lower side wall 25'. The side mounting brackets 50' preferably include means for engaging and receiving the coupling members 70' therethrough, such as an inner bracket portion 60' having a generally box-like shape with an outboard wall secured to the inner bracket wall 57' of the C-shaped bracket portion 55' and with a downwardly extending casing or sleeve-like portion of the inner bracket portion 60' including side mounting apertures 63' therein for receiving the respective coupling members 70', 71' therethrough. The side mounting apertures 63' are preferably internally threaded for fixing and positioning of the coupling members 70', as described further hereinafter.

The tow assembly 30' preferably includes upper and lower side reinforcement members 65' 66' for each of the corresponding side mounting brackets 50', similar to those described above with reference to FIGS. 1–4. It will be appreciated that the mounting brackets 50' and their respective reinforcement members 65', 66' are independent and separate from each other and are laterally spaced apart on opposing side rails 14' of the vehicle 10'.

The tow assembly 30' further includes first and second detachable coupling members 70' which are preferably longitudinally elongated bars. Preferably, each of the coupling members 70' has a forward hook portion 72' thereon for suitable attachment to another vehicle (not shown) for flat towing of the vehicle 10'. The coupling members 70' are preferably made of a sturdy material, such as metal. The coupling members 70' each preferably include a locking feature such as a rearward threaded end portion 73' for mating attachment with the threaded side mounting apertures 63' on the inner bracket portions 60' of the side mounting brackets 50'.

The tow assembly 30' is assembled to the vehicle 10' as follows. The bumper mounting brackets 31' are secured to the lower surface of the lower bumper wall 18', such as by the plurality of bumper bolts 33' and corresponding bumper washers 35' and bumper nuts 34'. However, it will be appreciated that other fastening methods could be used. Also during assembly, the upper and lower side reinforcement members 65', 66' are inserted through the side access openings in the side rails 14' against the inner side walls 22' and the side mounting brackets 50' are mounted to the side rails 14' by sliding the C-shaped bracket portions 55' over the upper, lower, and inner side walls 24', 25' 22'. The inner bracket portion 60' is placed adjacent the C-shaped bracket portion 55' and the side mounting brackets 50' are secured to the side rails 14', such as by the plurality of side rail bolts 52', washers 54', and nuts 53'. It will be appreciated the bumper mounting brackets 31' and the side mounting brackets 50' on each respective side of the vehicle 10' have coaxially aligned means for engaging and receiving the coupling members 70', such as bumper mounting apertures 37' and side mounting apertures 63' in the coupled condition.

It will be appreciated that the side mounting brackets 50', the side reinforcement members 65', 66', and the bumper mounting brackets 31' remain on the vehicle 10' when being driven under its own power. However, the coupling members 70' are advantageously easily removed from the tow assembly 30' when the vehicle 10' is not being towed such that the tow assembly 30' is in an uncoupled condition, as described further hereinafter. The total weight of the components which remain attached to the vehicle 10' are advantageously distributed over four separate and independent locations. Also advantageously, the total weight of these components including the bumper mounting brackets 31', the side mounting brackets 50', the upper and lower side reinforcement members 65', 66' and their associated fasteners 33', 34', 35', 52', 53', 54' all preferably have a combined weight of only about 7–15 lbs, which is also preferably about half the total weight of the tow assembly 30' with the coupling members 70'. Thus, this relatively small amount of total weight left on the vehicle 10' is distributed over four separate and independent locations having a minimal effect on the overall vehicle dynamics and vehicle noise and vibration paths. In addition, these relatively small and lightweight components which are strategically located on the bumper rail 12' and the side rails 14' can easily be positioned so as not to block any air intake portals (not shown) for the vehicle HVAC system. Also advantageously, these components of the partially assembled tow assembly 30' which are permanently left on the vehicle do not couple the bumper mounting brackets 31' and the side mounting brackets 50' to each other in any manner when the vehicle 10' is being driven under its own power with the coupling members 70' removed. This also advantageously minimizes any changes in the dynamic characteristics of the vehicle 10' while driving. Also advantageously, the tow assembly 30' is hidden from view in the uncoupled condition with the coupling members 70' removed.

The tow assembly 30' is completely assembled to the coupled condition for flat towing of the vehicle 10' as follows. The coupling members 70' are inserted through the respective coaxially aligned bumper mounting apertures 37' and side mounting apertures 63' such that the coupling members 70' extend between, engage and couple together the bumper mounting brackets 31' and the side mounting brackets 50' on the respective sides of the vehicle 10'. The coupling members 70' are then releasably secured to the respective bumper and side mounting brackets 31', 50' with the hook portions 72' extending forward of the bumper rail 12' for front access. In the embodiment shown in FIG. 5, the coupling members 70' are inserted through the respective bumper and side mounting brackets 31', 50' until the threaded end portions 73' on the coupling members 70' are screwed into the threaded side mounting apertures 63' and secured thereto, such as by a nut 80. Thus, the tow assembly 30' in the fully assembled, coupled condition is ready to be suitably attached to a forward located tow vehicle for flat towing of the vehicle 10'.

It will be appreciated that in the coupled condition, the coupling members 70' advantageously extend between and couple together the bumper rail 12' and bumper mounting brackets 31' with the respective longitudinally aligned side rails 14' and side mounting brackets 50' to provide good durability and strength. When the vehicle 10' is no longer being flat towed, the coupling members 70' are advantageously easily detached to reduce, preferably in half, the weight remaining on the vehicle 10' during driving conditions. Advantageously, removal of the easily detachable coupling members 70' has a weight reduction effect and a decoupling effect which minimizes the effects of the remaining components of the tow assembly 30' on vehicle dynamics and noise and vibration paths.

While the present embodiment has been described as carried out in a specific embodiment thereof, it is not intended to be limited thereby, but is intended to cover the invention broadly within the scope and spirit of the claims.

What is claimed is:

1. A tow assembly for use in a vehicle having a generally laterally extending front bumper rail and generally longitudinally extending, opposing first and second side rails, the tow assembly comprising:

first and second bumper mounting brackets each securely attached to the front bumper rail;

first and second side mounting brackets each securely attached to the first and second side rails, respectively; and first and second detachable coupling members each being longitudinally elongated, the first detachable coupling member extending longitudinally between and engaging the first bumper and side mounting brackets and the second detachable coupling member longitudinally extending between and engaging the second bumper and side mounting brackets;

whereby the tow assembly has a coupled condition in which the coupling members extend between and couple together the respective bumper and side mounting brackets for flat towing of the vehicle and the tow assembly has a decoupled condition in which the coupling members are removable from the tow assembly such that each of the bumper mounting brackets and side mounting brackets are separate and independent from each other.

2. A tow assembly for use in a vehicle, the tow assembly comprising:

a first pair of mounting brackets being longitudinally spaced apart from each other;

a second pair of mounting brackets being longitudinally spaced apart from each other and being laterally spaced apart from the first pair of mounting brackets; and first and second detachable coupling member for longitudinally extending between and engaging the first pair of mounting brackets and the second pair of mounting brackets, respectively;

whereby the tow assembly has a coupled condition in which the first and second coupling members extend between and couple together the first and second pairs of mounting brackets, respectively, for flat towing of the vehicle and the tow assembly has a decoupled condition in which the first and second coupling members are removable from the tow assembly such that each of the mounting brackets are separate and independent from each other when the vehicle is being driven.

3. The tow assembly of claim 2 wherein the vehicle includes a generally laterally extending bumper rail and generally longitudinally extending first and second side rails and wherein the first pair of mounting brackets has one of the mounting brackets secured to the bumper rail and another of the mounting brackets secured to the first side rail and wherein the second pair of mounting brackets has one of the mounting brackets secured to the bumper rail and another of the mounting brackets secured to the second side rail.

4. The tow assembly of claim 2 wherein the first and second coupling members have a combined weight which is approximately equal to half a total weight of the tow assembly.

5. The tow assembly of claim 2 wherein each of the mounting brackets being secured to the first and second side rails has a C-shaped portion for engaging the respective side rails.

6. The tow assembly of claim 2 wherein the first pair of mounting brackets have coaxially aligned features for engaging and receiving the first coupling member and wherein the second pair of mounting brackets have coaxially aligned features for engaging and receiving the second coupling member.

7. A tow assembly for use in a vehicle having a generally laterally extending front bumper rail and generally longitudinally extending opposing first and second side rails, the tow assembly comprising:

first and second bumper mounting brackets each securely attached to the front bumper rail and being laterally spaced apart;

first and second side mounting brackets each securely attached to the first and second side rails, respectively, the first side mounting brackets being longitudinally spaced apart from the first bumper mounting bracket and the second side mounting bracket being longitudinally spaced apart from the second bumper bracket; and first and second detachable coupling members each being longitudinally elongated bars, the first detachable coupling member extending between and engaging the first bumper and side mounting brackets and the second detachable coupling member extending between and engaging the second bumper and side mounting brackets;

whereby the tow assembly has a coupled condition in which the coupling members extend between and couple together the respective bumper and side mounting brackets for flat towing of the vehicle and the tow assembly has a decoupled condition in which the coupling members are removable from the tow assembly such that each of the bumper mounting brackets and side mounting brackets are separate and independent from each other.

8. The tow assembly of claim 7 wherein the first and second bumper mounting brackets and the first and second side mounting brackets each include means for engaging and receiving the coupling members.

9. The tow assembly of claim 8 wherein the means for engaging and receiving on the first bumper mounting bracket is coaxially aligned with the means for engaging and receiving on the first side mounting bracket and wherein the means for engaging and receiving on the second bumper mounting bracket is coaxially aligned with the means for engaging and receiving on the second side mounting bracket.

10. The tow assembly of claim 7 wherein the first and second side mounting brackets each include a C-shaped bracket portion for engaging the first and second side rails, respectively.

11. The tow assembly of claim 7 further including side reinforcement members secured to each of the side rails and aligned with each of the side mounting brackets.

12. The tow assembly of claim 11 wherein the side reinforcement members each include upper and lower L-shaped portions.

13. The tow assembly of claim 7 further including bumper reinforcement members secured to the bumper rail and aligned with each of the bumper mounting brackets.

14. The tow assembly of claim 7 wherein the first and second coupling members have a combined weight which is approximately equal to half a total weight of the tow assembly.

15. The tow assembly of claim 7 wherein the coupling members each include a hook portion extending forwardly of the bumper rail when the tow assembly is in the coupled condition.

* * * * *